(12) United States Patent
You

(10) Patent No.: US 8,838,297 B2
(45) Date of Patent: Sep. 16, 2014

(54) APPARATUS AND METHOD FOR FORECASTING GEOSTATIONARY SATELLITE ERROR

(71) Applicant: Electronics and Telecommunications Research Institute, Daejeon (KR)

(72) Inventor: Moon Hee You, Daejeon (KR)

(73) Assignee: Electronics and Telecomunications Research Institute, Daejeon (KR)

( * ) Notice: Subject to any disclaimer, the term of this patent is extended or adjusted under 35 U.S.C. 154(b) by 0 days.

(21) Appl. No.: 13/919,158

(22) Filed: Jun. 17, 2013

(65) Prior Publication Data

US 2014/0058592 A1  Feb. 27, 2014

(30) Foreign Application Priority Data

Aug. 21, 2012  (KR) ........................ 10-2012-0091066

(51) Int. Cl.
*B64G 1/10* (2006.01)
*B64G 1/54* (2006.01)

(52) U.S. Cl.
CPC ........................................ *B64G 1/54* (2013.01)
USPC ................................ 701/3; 701/31.9; 701/39

(58) Field of Classification Search
None
See application file for complete search history.

(56) References Cited

U.S. PATENT DOCUMENTS

| | | | |
|---|---|---|---|
| 7,096,121 | B2 | 8/2006 | Intriligator et al. |
| 2002/0107638 | A1* | 8/2002 | Intriligator et al. ................ 702/3 |
| 2006/0229813 | A1* | 10/2006 | Tobiska ............................ 702/2 |
| 2010/0088074 | A1* | 4/2010 | Koller et al. ...................... 703/2 |

FOREIGN PATENT DOCUMENTS

| | | |
|---|---|---|
| KR | 101021530 B1 | 3/2011 |
| KR | 101066878 B1 | 9/2011 |

OTHER PUBLICATIONS

Analysis and Prediciton of Satellite Anomalies. Peter Wintoft . . . Accessed on the web on Dec. 13, 2013. Wayback machine cites theis document back to Nov. 20, 2008.*
Space Weather Prediciton Center—NOAA Scales. Accessed on the web on Dec. 13, 2013. Wayback machine cites this document back to Jun. 13, 2007.*
Moon Hee You et al., Correlation Analysis between Space Environment and Anomaly Events of GEO Satellites, 2012 KICS Conference, Jun. 20-22, 2012,p. 1171-1172, vol. 48, The Korean Institute of Communications and Information Sciences, South Korea.
Moon Hee You et al., Correlation Analysis between Space Environment and LEO/MEO Satellite Anomalies, 2012 IEEK Summer Conference, Jun. 27-29, 2012, p. p. 668-670, vol. 35-1, The Institute of Electronics Engineers of Korea, South Korea.

* cited by examiner

*Primary Examiner* — John R Olszewski
*Assistant Examiner* — Jess Whittington
(74) *Attorney, Agent, or Firm* — William Park & Associates Patent Ltd.

(57) ABSTRACT

An apparatus and method for forecasting a geostationary satellite anomaly is provided. The method may include storing at least one piece of space environmental information, satellite information, and satellite anomaly event information, and estimating a satellite anomaly susceptibility to a space environmental phenomenon based on the at least one piece of space environmental information, the satellite information, and the anomaly event information.

18 Claims, 4 Drawing Sheets

APPARATUS AND METHOD FOR FORECASTING GEOSTATIONARY SATELLITE ERROR

CROSS-REFERENCE TO RELATED APPLICATION

This application claims the priority benefit of Korean Patent Application No. 10-2012-0091066, filed on Aug. 21, 2012, in the Korean Intellectual Property Office, the disclosure of which is incorporated herein by reference.

BACKGROUND

1. Field of the Invention

Exemplary embodiments of the present invention relate to an apparatus and method for forecasting a geostationary satellite anomaly, and more particularly, to an apparatus and method for forecasting a probability of an error of a geostationary satellite in a geostationary orbit based on space environmental information.

2. Description of the Related Art

Generally, space environment forecast technologies focus on forecasting a space environmental phenomenon through a predetermined pattern or model of the corresponding space environmental phenomenon using measured data associated with various space environmental phenomena, for example, cosmic rays, corona emissions, a solar wind, a magnetic storm, and the like.

For example, space environment forecast technologies forecast a space environmental phenomenon by comparing measured space environment parameters to a predetermined critical value.

The space environmental phenomenon mainly caused by solar activity may have an influence on a ground-based system, for example, a communication system, a power system, an aviation system, a satellite system, and the like.

Accordingly, most ground-based systems may be need to be protected from attacks of space environmental phenomena due to a magnetic field around the Earth.

However, because a geostationary satellite placed about 36,000 kilometers (km) above the Equator is located at the edge of a magnetic field of the Earth, the geostationary satellite may be critically damaged when a solar wind blowing out from the Sun or corona emissions forces the magnetic field to move toward the Earth.

To reduce the damage, the geostationary satellite may power off a system in operation. However, when a service being provided through, for example, a commercial communication satellite is stopped, considerable economic loss may occur. Accordingly, accurate forecasting of a geostationary satellite anomaly is needed.

SUMMARY

According to an aspect of the present invention, there is provided an apparatus for forecasting a geostationary satellite anomaly, the apparatus including a storage unit to store at least one piece of space environmental information, satellite information, and satellite anomaly event information, and an estimation unit to estimate a satellite anomaly susceptibility to a space environmental phenomenon based on the at least one piece of space environmental information, the satellite information, and the satellite anomaly event information.

The estimation unit may update the satellite anomaly susceptibility using the at least one piece of space environmental state information received in real-time.

The estimation unit may estimate a satellite anomaly probability based on the satellite anomaly susceptibility updated in real-time.

The satellite information may include orbital information and satellite operating information.

The estimation unit may estimate the satellite anomaly susceptibility for a predetermined range of a section, based on the at least one piece of space environmental information and the satellite anomaly event information.

The apparatus may further include a receiving unit to receive information about a new geostationary satellite, information about a non-operational geostationary satellite, and information about a broken-down geostationary satellite.

The estimation unit may update the satellite anomaly susceptibility in real-time using the at least one of space environmental information state received, the information received about the new geostationary satellite, the information received about the non-operational geostationary satellite, and the information received about the broken-down geostationary satellite.

The apparatus may further include an output unit to output the satellite anomaly susceptibility, and a transmitting unit to transmit the satellite anomaly susceptibility to at least one device.

According to an aspect of the present invention, there is provided a method of forecasting a geostationary satellite anomaly, the method including storing at least one piece of space environmental information, satellite information, and satellite anomaly event information, and estimating a satellite anomaly susceptibility to a space environmental phenomenon based on the at least one piece of space environmental information, the satellite information, and the anomaly event information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
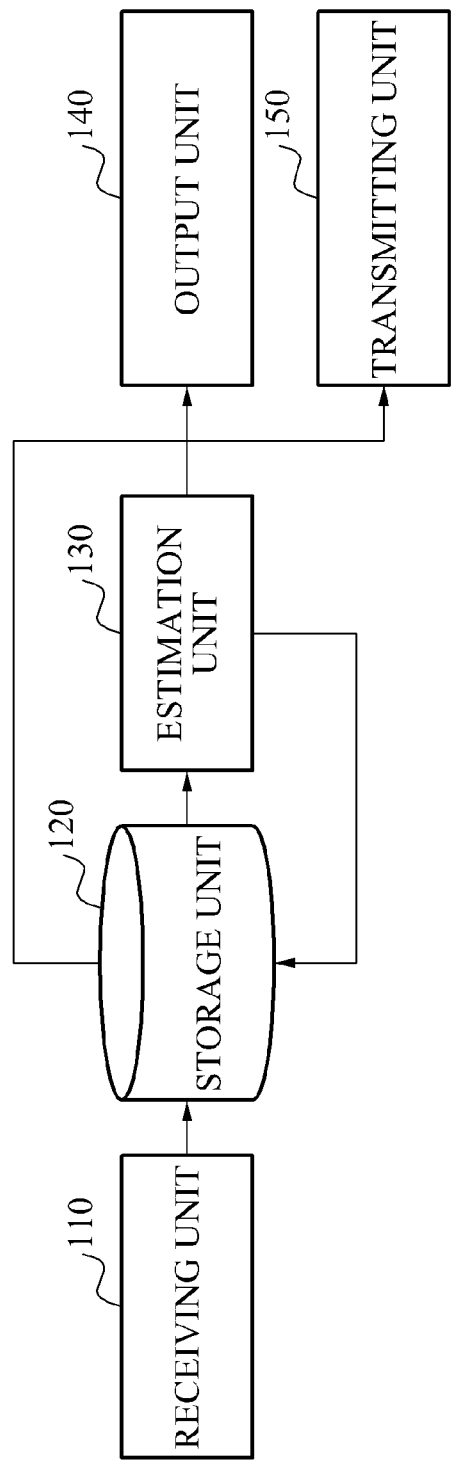
FIG. 1 is a block diagram illustrating a structure of an apparatus for forecasting a geostationary satellite anomaly according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a structure of an apparatus for forecasting a geostationary satellite anomaly according to an embodiment of the present invention.

Referring to FIG. 1, the apparatus for forecasting a geostationary satellite anomaly may include a receiving unit 110, a storage unit 120, an estimation unit 130, an output unit 140, and a transmitting unit 150.

The apparatus for forecasting a geostationary satellite anomaly may receive, through the receiving unit 110, information about a new geostationary satellite, information about a non-operational geostationary satellite, and information about a broken-down geostationary satellite.

Figure 2:
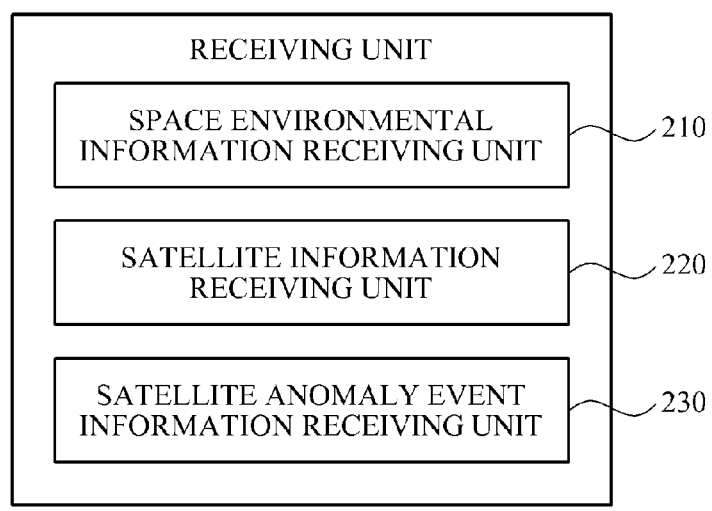
FIG. 2 is a block diagram illustrating a structure of a receiving unit according to an embodiment of the present invention.

FIG. 2 is a block diagram illustrating a structure of a receiving unit 200 according to an embodiment of the present invention.

The receiving unit 200 may include a space environmental information receiving unit 210, a satellite information receiving unit 220, and a satellite anomaly event information receiving unit 230.

Referring to FIGS. 1 and 2, the apparatus for forecasting a geostationary satellite anomaly may store space environmental information being received in real-time in the storage unit 120 automatically, and may store up-to-date information about a new geostationary satellite being launched, up-to-date information about a non-operational geostationary satellite, and up-to-date information about a broken-down geostationary satellite in the storage unit 120, manually.

The apparatus for forecasting a geostationary satellite anomaly may receive at least one piece of space environmental information through the space environmental information receiving unit 210, geostationary satellite information through the geostationary satellite information receiving unit 220, and satellite anomaly event information through the satellite anomaly event information receiving unit 230, and may store the received information in the storage unit 120.

The space environmental information receiving unit 210 may be connected to a space environment center that provides various space environmental information about space environmental phenomena, for example, cosmic rays, corona emissions, a solar wind, a magnetic storm, and the like, in real-time, to receive at least one piece of space environmental information. For example, the space environmental information receiving unit 210 may receive information in an approximate range greater than 10 mega-electron volts (MeV) proton flux, greater than 2 MeV electron flux, and a planetary K-index (Kp-index) in real-time, and may transmit the received information to the storage unit 120.

The satellite information receiving unit 220 may receive various types of information about a new geostationary satellite being launched that is unregistered in the storage unit 120, for example, a satellite identification (ID), a satellite name, a launch date, a satellite manufacturer, a satellite model, a satellite mission, orbital information including a latitude, an inclination angle, and an altitude, an expected life span, a satellite retirement date, orbital change information caused by an operational change, an unplanned non-working date, and the like, and may transmit the received information to the storage unit 120.

The satellite anomaly event information receiving unit 230 may receive anomaly event information of a broken-down geostationary satellite that is unregistered in the storage unit 120, for example, an anomaly occurrence date, an anomaly resolution date, a satellite ID, a satellite name, an anomaly type, a damaged element, and the like, and may transmit the received information to the storage unit 120.

Figure 3:
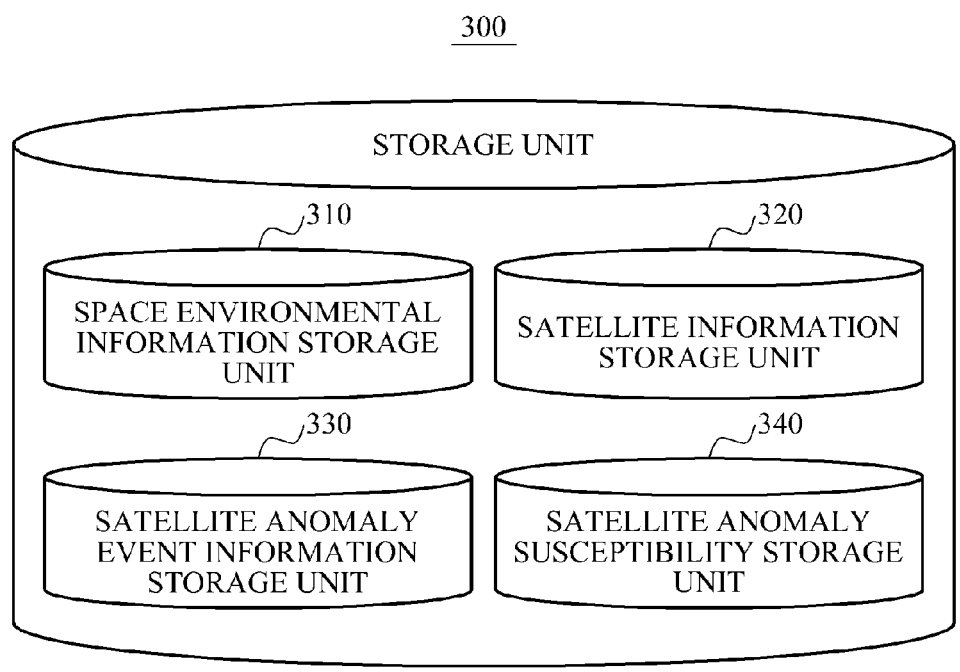
FIG. 3 is a block diagram illustrating a structure of a storage unit according to an embodiment of the present invention.

FIG. 3 is a block diagram illustrating a structure of a storage unit 300 according to an embodiment of the present invention.

The storage unit 300 may include a space environmental information storage unit 310, a satellite information storage unit 320, a satellite anomaly event information storage unit 330, and a satellite anomaly susceptibility storage unit 340.

The apparatus for forecasting a geostationary satellite anomaly may store the at least one piece of space environmental information in the space environmental information storage unit 310, the satellite information in the satellite information storage unit 320, and the satellite anomaly event information in the satellite anomaly event information storage unit 330.

Referring to FIGS. 1 through 3, the estimation unit 130 may estimate a satellite anomaly susceptibility to a space environmental phenomenon based on the at least one piece of space environmental information, the satellite information, and the satellite anomaly event information.

The estimation unit 130 may update the satellite anomaly susceptibility using the at least one piece of space environmental information received in real-time, and may estimate a satellite anomaly probability based on the satellite anomaly susceptibility updated in real-time.

The satellite information may include orbital information and satellite operating information.

The estimation unit 130 may estimate the satellite anomaly susceptibility for a predetermined range of a section based on the at least one piece of space environmental information and the satellite anomaly event information.

The estimation unit 130 may update the satellite anomaly susceptibility using the at least one piece of space environmental information received, the information received about the new geostationary satellite, the information received about the non-operational geostationary satellite, and the information received about the broken-down geostationary satellite. The estimation unit 130 may update the satellite anomaly susceptibility for each section using the up-to-date space environmental information and the up-to-date satellite anomaly event information.

The estimation unit 130 may estimate the satellite anomaly probability for a space environment parameter of a predetermined value and a type of a probable anomaly, using the at least one piece of space environmental information received, the information received about the new geostationary satellite, the information received about the non-operational geostationary satellite, and the information received about the broken-down geostationary satellite.

The apparatus for forecasting a geostationary satellite anomaly may output the satellite anomaly susceptibility through the output unit 140, and may transmit the satellite anomaly susceptibility to at least one device through the transmitting unit 150.

The apparatus for forecasting a geostationary satellite anomaly may further include a forecast control unit. The forecast control unit may output, through the output unit 140, the information stored in the storage unit 120 and the estimated satellite anomaly susceptibility for a predetermined period of time at a predetermined output location, and may transmit forecast information to at least one device through the transmitting unit 150.

The apparatus for forecasting a geostationary satellite anomaly may display the forecast information using a graphical user interface (GUI) to provide quick and easy understanding to users, and may transmit the forecast information to a device corresponding to predetermined address data by a predetermined transmission scheme, for example, via an Internet connection, a mobile communication network, a facsimile transmission, and the like.

The estimation unit 130 may estimate the satellite anomaly susceptibility $P_{error}$ based on Equation 1.

$$P_{error} = \sum_k W_k \frac{N_{e,k}}{N_{s,k}} \qquad \text{[Equation 1]}$$

where k denotes an ID of space environmental information, $W_k$ denotes a predetermined weight value for a satellite anomaly ratio, $N_s$ denotes a number of proton fluxes, and $N_e$ denotes a number of satellite anomaly events.

For example, the apparatus for forecasting a geostationary satellite anomaly may estimate the satellite anomaly susceptibility as follows.

The assumption may be that a representative value of in an approximate range greater than 10 MeV proton flux as one of the space environment parameters refers to a maximum value of greater than 10 MeV proton flux, an average value greater than 10 MeV proton flux, or a minimum value of greater than 10 MeV proton flux during a predetermined period of time, for example, on six day scales, from 0:00 five days before the reference date to 24:00 the reference day, based on data measured since 1986, the start of Solar Cycle 22.

The apparatus for forecasting a geostationary satellite anomaly may calculate a number $N_s$ in an approximate range of greater than 10 MeV proton flux accumulatively over the entire period of time by a predetermined order of magnitude, for example, $10^{-3}$, $10^{-2}$, $10^{-1}$, and the like, and may calculate a number $N_e$ of satellite anomaly events accumulatively over the entire period of time by the same order of magnitude, while being mapped to the representative value greater than 10 MeV proton flux for each satellite anomaly event.

The apparatus for forecasting a geostationary satellite anomaly may calculate, for a predetermined section of the greater than 10 MeV proton flux input in real-time, a ratio of a number $N_s$ of previous satellite anomaly events to a number $N_e$ of a previous value that is greater than 10 MeV proton flux, as given in Equation 1. The apparatus for forecasting a geostationary satellite anomaly may calculate the satellite anomaly ratio for each space environment parameter.

The apparatus for forecasting a geostationary satellite anomaly may apply a predetermined weight value W to the satellite anomaly ratio for each space environment parameter, and may calculate a sum of the results, to determine the satellite anomaly susceptibility to a current space environmental state.

Figure 4:
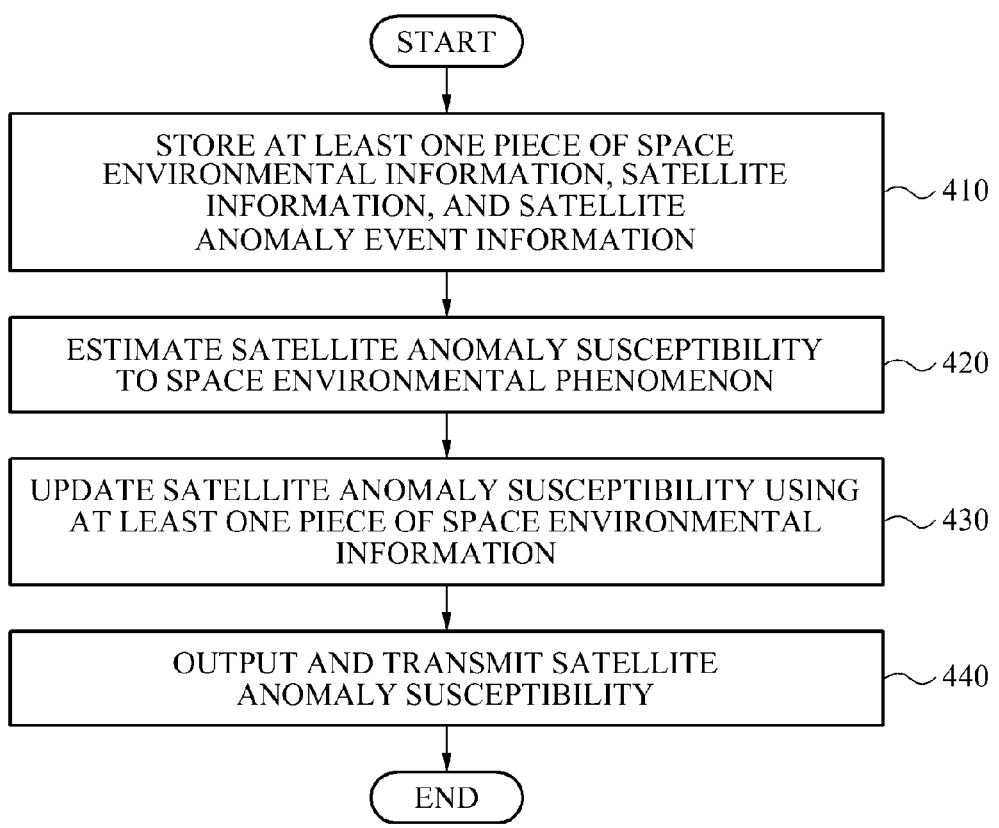
FIG. 4 is a flowchart illustrating a method of forecasting a geostationary satellite anomaly according to an embodiment of the present invention.

FIG. 4 is a flowchart illustrating a method of forecasting a geostationary satellite anomaly according to an embodiment of the present invention.

Referring to FIG. 4, in operation 410, the apparatus for forecasting a geostationary satellite anomaly may store at least one piece of space environmental information, satellite information, and satellite anomaly event information.

In operation 420, the apparatus may estimate a satellite anomaly susceptibility to a space environmental phenomenon based on the at least one piece of space environmental information, the satellite information, and the satellite anomaly event information.

In operation 430, the apparatus may update the satellite anomaly susceptibility using the at least one piece of space environmental information, information about a new geostationary satellite, information about a non-operational geostationary satellite, and information about a broken-down geostationary satellite.

In operation 440, the apparatus may output the satellite anomaly susceptibility, or may transmit the satellite anomaly susceptibility to at least one device.

According to the exemplary embodiments of the present invention, the apparatus for forecasting a geostationary satellite anomaly may estimate a satellite anomaly susceptibility to a space environmental phenomenon using space environmental information and satellite anomaly event information.

The apparatus may improve accuracy of the satellite anomaly susceptibility through continuous updating of the space environmental information.

The apparatus may provide an accurate satellite anomaly probability by applying space environmental information updated in real-time to the satellite anomaly susceptibility.

The apparatus may enable a satellite operating system or a satellite operator to respond to a satellite anomaly quickly and accurately.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for forecasting a geostationary satellite anomaly, the apparatus comprising:
   a storage unit configured to store (a) at least one piece of space environmental information, (b) satellite information, and (c) satellite anomaly event information; and
   an estimation unit configured to estimate a satellite anomaly susceptibility to a space environmental phenomenon based on (a) the at least one piece of space environmental information, (b) the satellite information, and (c) the satellite anomaly event information, wherein the satellite anomaly susceptibility is estimated based on a ratio of a number of satellite anomaly events divided by a number of proton fluxes.

2. The apparatus of claim 1, wherein the estimation unit updates the satellite anomaly susceptibility using the at least one piece of space environmental state information received in real-time.

3. The apparatus of claim 1, wherein the estimation unit estimates a satellite anomaly probability based on the satellite anomaly susceptibility updated in real-time.

4. The apparatus of claim 1, wherein the satellite information includes orbital information and satellite operating information.

5. The apparatus of claim 1, wherein the estimation unit estimates the satellite anomaly susceptibility based on (a) the at least one piece of space environmental information and (b) the satellite anomaly event information.

6. The apparatus of claim 2, further comprising a receiving unit configured to receive information relating to a new geostationary satellite, information relating to a non-operational geostationary satellite, and information relating to a broken-down geostationary satellite.

7. The apparatus of claim 6, wherein the estimation unit updates the satellite anomaly susceptibility in real-time using (a) the at least one piece of space environmental state information received, (b) the received information relating to the new geostationary satellite, (c) the received information relating to the non-operational geostationary satellite, and (d) the received information relating to the broken-down geostationary satellite.

8. The apparatus of claim 1, further comprising:
an output unit configured to output the satellite anomaly susceptibility; and
a transmitting unit configured to transmit the satellite anomaly susceptibility to at least one device.

9. The apparatus of claim 1, wherein the estimation unit estimates the satellite anomaly susceptibility $P_{error}$ based on Equation 1:

$$P_{error} = \sum_k W_k \frac{N_{e,k}}{N_{s,k}} \quad \text{[Equation 1]}$$

where k denotes an identifier of the space environmental information received, $W_k$ denotes a predetermined weight value for a satellite anomaly ratio, $N_s$ denotes a number of proton fluxes, and $N_e$ denotes a number of satellite anomaly events.

10. A method comprising:
storing, by a computing apparatus, (a) at least one piece of space environmental information, (b) satellite information, and (c) satellite anomaly event information; and
estimating, by a computing apparatus, a satellite anomaly susceptibility to a space environmental phenomenon based on (a) the at least one piece of space environmental information, (b) the satellite information, and (c) the satellite anomaly event information, wherein the satellite anomaly susceptibility is estimated based on a ratio of a number of satellite anomaly events divided by a number of proton fluxes.

11. The method of claim 10, further comprising updating the satellite anomaly susceptibility using the at least one piece of space environmental information received in real-time.

12. The method of claim 10, wherein the estimating of the satellite anomaly susceptibility comprises estimating a satellite anomaly probability based on the satellite anomaly susceptibility updated in real-time.

13. The method of claim 10, wherein the satellite information includes orbital information and satellite operating information.

14. The method of claim 10, wherein the estimating of the satellite anomaly susceptibility comprises estimating the satellite anomaly susceptibility based on (a) the at least one piece of space environmental information and (b) the satellite anomaly event information.

15. The method of claim 11, further comprising receiving information relating to a new geostationary satellite, information relating to a non-operational geostationary satellite, and information relating to a broken down geostationary satellite.

16. The method of claim 15, further comprising updating the satellite anomaly susceptibility using (a) the at least one piece of space environmental information received, (b) the received information relating to the new geostationary satellite, (c) the received information-relating to the non-operational geostationary satellite, and (d) the received information relating to the broken down geostationary satellite.

17. The method of claim 10, further comprising:
outputting the satellite anomaly susceptibility; and
transmitting the satellite anomaly susceptibility to at least one device.

18. The method of claim 10, wherein the estimating of the satellite anomaly susceptibility comprises estimating the satellite anomaly susceptibility $P_{error}$ based on Equation 2:

$$P_{error} = \sum_k W_k \frac{N_{e,k}}{N_{s,k}} \quad \text{[Equation 2]}$$

where k denotes an identifier of the space environmental information received, $W_k$ denotes a predetermined weight value for a satellite anomaly ratio, $N_s$ denotes a number of proton fluxes, and $N_e$ denotes a number of satellite anomaly events.

* * * * *